United States Patent [19]

Warner et al.

[11] 4,298,796

[45] Nov. 3, 1981

[54] METHOD OF, AND APPARATUS FOR, MONITORING RADIOACTIVITY

[76] Inventors: Gerald T. Warner, Pullen's Field, Headington, Oxford; Colin G. Potter, Ivy Cottage, Lower End, Leafield, Oxfordshire, both of England

[21] Appl. No.: 51,231

[22] Filed: Jun. 22, 1979

Related U.S. Application Data

[63] Continuation of Ser. No. 835,038, Sep. 20, 1977.

[30] Foreign Application Priority Data

Sep. 24, 1976 [GB] United Kingdom ............. 39853/76

[51] Int. Cl.³ ............................ G01T 1/00; G01T 1/20
[52] U.S. Cl. ................................ 250/328; 250/361 R; 250/367
[58] Field of Search ............... 250/328, 361 R, 363 S, 250/366, 367, 458

[56] References Cited

U.S. PATENT DOCUMENTS 3,855,473  12/1974  Burgess et al. ..................... 250/328
3,931,520  1/1976   Bell et al. ............................ 250/328
4,005,292  1/1977   Oesterlin et al. .................... 250/367
4,071,761  1/1978   Horrocks ............................. 250/366

*Primary Examiner*—Davis L. Willis
*Assistant Examiner*—Janice A. Howell
*Attorney, Agent, or Firm*—Fisher, Christen & Sabol

[57] ABSTRACT

The radioactivity of discrete areas of radioactive material on a surface region of a support layer is monitored by converting the radioactivity emitted by these areas into light emissions with the use of a suitable scintillant, and scanning the surface region with at least one photodetector in a plurality of discontinuous steps. Each step places the support layer and the or each photodetector in relative positions in which the or each photodetector detects at least a proportion of the light emissions activated by a respective one of the areas of radioactive material over a finite interval of time. A plurality of output signals are therefore produced by the photodetector(s), each of which is proportional to the radioactivity of a respective one of the areas of radioactive material.

14 Claims, 2 Drawing Figures

METHOD OF, AND APPARATUS FOR, MONITORING RADIOACTIVITY

This is a continuation of application Ser. No. 835,038, filed Sept. 20, 1977.

BACKGROUND OF THE INVENTION

This invention relates to a method of, and apparatus for, monitoring the radioactivity of a plurality of discrete areas of radioactive material on a surface region of a support layer.

Many experiments involve the study of the incorporation of radioactive chemicals into acid-precipitable material, for example the incorporation of radioactive thymidine into the DNA of lymphocytes. Some experiments involve the analysis of several hundred different test combinations, each performed in quadruplicate. Because of the length of time required to precipitate each of the cell cultures separately after incubation and the variability introduced by performing multiple manipulations of each culture, it is advantageous to utilize an apparatus which allows simultaneous precipitation of many samples with a minimum of sample handling. An example of such an apparatus is a cell harvester known under the Trade Mark "Titertek". This harvester is designed to harvest 12 microcultures at a time by means of 12 pairs of small tubes spaced to line up with a row of 12 wells in a 96-well microtitration plate. The microcultures are automatically precipitated on a glassfibre filter mat in the form of a regular 8 by 12 matrix configuration of small, regularly shaped areas of precipitate approximately 1 cm in diameter when all 96 microcultures have been harvested. If the microcultures are labelled with beta-emitting isotopes, the labelled cells are thus separated from the unincorporated isotope. The areas of precipitate typically occupy an area of 25 cm×8 cm.

It is known to monitor the radioactivity of the separate areas of precipitate as follows. Each of the 96 areas of precipitate are first separated, for example by punching out areas of the filter mat, and each portion of filter mat containing a respective area of precipitate is placed in a separate vial together with scintillation fluid. A scintillation counter is then employed to assess the radioactivity of the area of precipitate in each vial. Such a process is of course extremely time consuming, expecially if a large number of samples are to be processed. Furthermore, it is of course important that it should be known from which position on the mat each area of precipitate in each vial has been taken. Failure to label the vials correctly can lead to muddling of the samples.

SUMMARY OF THE INVENTION

According to one aspect of the present invention, there is provided a method of monitoring the radioactivity of discrete areas of radioactive material on a surface region of a support layer, wherein the radioactivity emitted by the radioactive material is converted into light emissions by a scintillant in or immediately adjacent to the layer in the vicinity of the surface region, and at least one photodetector is used to scan the surface region in a plurality of discontinuous steps in such a manner as to provide a plurality of output signals, each of which corresponds to at least a proportion of the light emissions activated by a respective one of the discrete areas of radioactive material.

According to another aspect of the present invention, there is provided apparatus for monitoring the radioactivity of discrete areas of radioactive material on a surface region of a support layer, which apparatus comprises:

(a) support means for supporting the support layer;

(b) photodetector means for detecting light emissions from a scintillant in or immediately adjacent to the support layer in the vicinity of the surface region, when activated by the radioactivity emitted by the radioactive material; and (c) scanning means for providing relative movement between the support layer and the photodetector means in a plurality of discontinuous steps to provide a plurality of output signals, each of which corresponds to at least a proportion of the light emissions activated by a respective one of the discrete areas of radioactive material.

BRIEF DESCRIPTION OF THE DRAWINGS

For a better understanding of the present invention, and to show more clearly how the same may be carried into effect, reference will now be made, by way of example, to the accompanying drawing, in which.

DETAILED DESCRIPTION OF THE DRAWINGS

Figure 1:
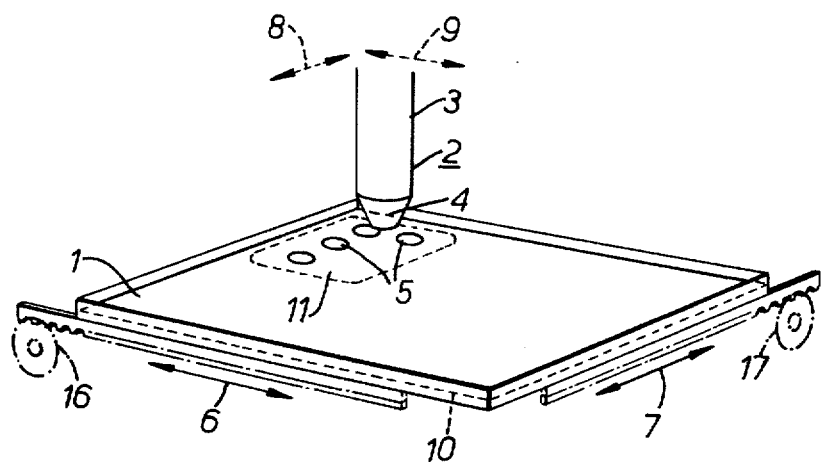
FIG. 1 is a synoptic perspective view of apparatus used in an embodiment of the present invention.

The apparatus of FIG. 1 comprises support means in the form of a container 1 and photodetector means 2. The container 1 is adapted to contain a support layer in the form of a filter mat 10 (indicated by broken lines in the figures) of paper or fibreglass or a gel, on a surface region of which discrete areas 5 of radioactive material, for example beta-labelled cell cultures, have been precipitated in the course of a filtering process. The support layer may also be a medium on which a continuous band of material of varying radioactive content has been produced by chromatography or electrophoresis. The container 1 is also adapted to contain a scintillant 11 which may be a liquid, a solid or a gel, and in which scintillations may be induced by radioactivity emitted by the radioactive material. The container 1 may be made of plastics material or glass and should be resistant to the scintillant and transparent to scintillations therefrom. The container 1 should be so dimensioned as to accommodate the full length and breadth of the filter mat 10, and has a depth of, for example, 0.05 cm to 5 cm.

The photodetector means 2 comprises a photomultiplier tube 3 and a light guide 4 for directing the light of scintillations from the container 1 to the photomultiplier tube 3. The apparatus further comprises scanning means in the form of a rack and pinion system 16 for displacing the container 1 in the direction of the double-headed arrow 6 and a rack and pinion system 17 for displacing the container 1 in the direction of the double-headed arrow 7.

In use of the apparatus, a filter mat 10 comprising, for example, 96 small, regularly spaced areas of radioactive material in a 8 by 12 matrix configuration is placed directly in the container 1 and a liquid scintillant is added. The container 1 is then positioned with respect to the photodetector means 2 such that an area of radioactive material at one of the four corners of the matrix configuration is disposed immediately below the light guide 4, and a proportion of the light emissions from the scintillant activated by the radioactivity emitted by this area over a finite interval of time is counted by the photodetector means 2. An output proportional to the radioactivity of this area is then produced. The container 1 is then displaced using one of the systems 16 and 17 until an adjacent area of radioactive material is directly below the light guide 4. A proportion of the light emissions activated by this area is then counted over a further finite interval of time and a further output is produced. Further stepwise displacement of the container 1 and counting of the light emissions activated by a respective area of radioactive material takes place until the radioactivity emitted by each of the 96 areas of radioactive material has been monitored. Thus the photodetector means 2 emits 96 output signals in succession, each output signal being proportional to the radioactive content of a respective one of the 96 areas of radioactive material. The areas of radioactive material may be scanned in any sequence. For example, the areas may be scanned in rows, adjacent rows being scanned in opposite directions. However the particular sequence of scanning chosen will depend upon the distribution of the areas of radioactive material.

Figure 2:
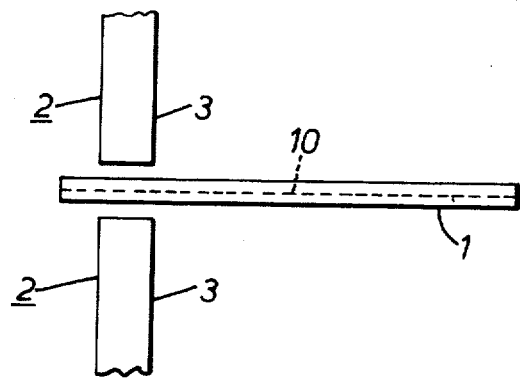
FIG. 2 is a side view of apparatus used in another embodiment of the present invention.

In the apparatus of FIG. 2, the photodetector means 2 comprises two photomultiplier tubes 3 disposed one on either side of the container 1 containing the filter mat 10. This apparatus operates in the same way as the apparatus of FIG. 1, although the provision of two photomultiplier tubes 3 enables a system of coincidence detection to be utilized.

In the case of both FIG. 1 and FIG. 2, the input area of the or each photomultiplier tube 3, or the input area of the light guide 4 should correspond to a single area of radioactive material on the mat 10.

It is also possible for the photodetector means 3 to comprise a multidetector configuration capable of monitoring two or more areas of radioactive material simultaneously. It is also possible for the scanning means to comprise means for moving the photodetector means 2 in the direction shown by the double-headed arrows 8 and 9 in broken lines in FIG. 1, whilst the container 1 is held rigid. Movement of the container 10 or the photodetector means 2 may be controlled by a pre-programmed automated system or may be manually controlled. It is possible that electronic scanning could be utilised in place of mechanical scanning.

In an alternative embodiment, the container 1 could itself be made of a glass or plastics scintillant, in which case added scintillant need not be provided. A further possibility is that the filter mat itself may be composed of a scintillant, for example glass scintillant fibres. In such a case a container 10 would be unnecessary. It may also be possible for a scintillant to be incorporated in the photodetector means 2. Provided that the background count remains at an acceptably low level and assuming that the radioactive material is adequately bonded to the filter mat, the scintillant can be reused after each monitoring process without imparing the efficiency of subsequent monitoring processes. It is envisaged that a tank may be provided for recycling scintillant.

The container 1 and the counting head may be provided as an integral unit in the apparatus or the container may be separately loadable in the apparatus for positioning in relation to the photodetector means 2. The container 1 may be moved mechanically into and out of the position in which it is intended to be monitored either under manual or automatic control.

In the embodiment described with reference to FIG. 1, the mat 10 may be placed within the container 1 with its surface region containing the areas 5 of radioactive material directed either towards or away from the photodetector means 2.

It is also possible for the input area of the photomultiplier tube or light guide to be smaller than the areas of radioactive material so that the detector merely "samples" these areas. It would also be possible for the input area of the photomultiplier tube or light guide to be of sufficient size that two or more of the areas of radioactive material may be monitored simultaneously.

In the case of the apparatus being utilized to monitor the radioactivity of a continuous band of beta-emitting material such as may be produced by chromatography or electrophoresis, it is envisaged that the scanning means will be adapted to provide stepwise relative displacement between the support layer and the photodetector means so that selected areas of radioactive material equally spaced apart along the band are sampled by the photodetector means, each over a finite interval of time. However, if the radioactive content of the material is sufficiently high, it may be possible continuously to scan the band of material.

Scintillation counting is a more accurate method of monitoring radioactivity than many other counting methods.

We claim:

1. Method of monitoring the beta emissions of a plurality of samples of radioactive materials, comprising the steps of:
    depositing said plurality of samples on a single support layer in a plurality of discrete areas disposed in a predetermined pattern;
    confining a single body of liquid scintillant in proximity to the surface region of said support layer where said plurality of samples are deposited as a whole to convert said beta emissions into light emissions, and;
    scanning the surface region of said support layer in a plurality of discontinuous steps to provide a plurality of output signals, each of which corresponds to at least a proportion of the light emissions activated by a respective one of said samples.

2. A method according to claim 1, wherein, during scanning, the support layer is disposed within a container which also contains liquid scintillant.

3. A method according to claim 1, wherein the areas of radioactive material are a plurality of small, regularly shaped areas of cell culture material incorporating beta-emitting isotopes.

4. A method according to claim 3, wherein the support layer is a filter mat.

5. A method according to claim 3, wherein there are between 10 and 500 areas of cell culture material equally spaced apart on the support layer.

6. A method according to claim 5, wherein there are 96 areas of cell culture material disposed in a regular 8 by 12 matrix configuration on the support layer.

7. A method according to claim 1, wherein the areas of radioactive material are selected areas of a continuous band of radioactive material obtained by chromatography or electrophoresis.

8. Apparatus for monitoring the beta emissions of a plurality of samples, of radioactive materials, comprising:
    a single support layer for a plurality of said samples deposited thereon in a predetermined pattern of discrete areas;

means to support a single body of liquid scintillant in proximity to the surface region of said support layer in the region of said deposited samples to convert said beta emissions into light emissions;

photodetector means to provide a plurality of signals, each of which corresponds to at least a proportion of the light emissions activated by a respective one of said deposited samples, and;

mounting means for relative movement between said support layer and photodetector means in a plurality of predetermined discontinuous steps to provide said plurality of signals.

9. Apparatus according to claim 8, wherein the support means is a container for containing the support layer.

10. Apparatus according to claim 9, wherein the container is made of a glass or plastics scintillant.

11. Apparatus according to claim 8, wherein the photodetector means comprises two photodetectors disposed opposite each other, one on either side of the support means.

12. Apparatus according to claim 8, wherein the photodetector means comprises a multidetector configuration for monitoring two or more areas of radioactive material simultaneously.

13. Apparatus according to claim 8 wherein the means to support said liquid scintillant comprises means for moving the support means.

14. Apparatus according to claim 8 wherein the means to support said liquid scintillant comprises means for moving the photodetector means.

* * * * *